US011264829B2

(12) United States Patent
Singer et al.

(10) Patent No.: US 11,264,829 B2
(45) Date of Patent: Mar. 1, 2022

(54) DYNAMICALLY CONFIGURING BATTERIES IN A POWER SYSTEM

(71) Applicant: INTERNATIONAL BUSINESS MACHINES CORPORATION, Armonk, NY (US)

(72) Inventors: Noah Singer, White Plains, NY (US); Robert K. Mullady, Highland, NY (US); Steven J. Ahladas, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 16/803,107

(22) Filed: Feb. 27, 2020

(65) Prior Publication Data

US 2021/0273479 A1 Sep. 2, 2021

(51) Int. Cl.
*H02J 9/00* (2006.01)
*H02J 9/06* (2006.01)
*G05F 1/66* (2006.01)
*H02J 1/10* (2006.01)

(52) U.S. Cl.
CPC ............... *H02J 9/061* (2013.01); *G05F 1/66* (2013.01); *H02J 1/102* (2013.01); *H02J 1/106* (2020.01)

(58) Field of Classification Search
CPC ...... H02J 9/04; H02J 9/06; H02J 9/061; H02J 9/063; H02J 9/068; H02J 3/007; H02J 3/0073
See application file for complete search history.

(56) References Cited

U.S. PATENT DOCUMENTS

| | | | |
|---|---|---|---|
| 8,624,433 B2 | 1/2014 | Whitted et al. | |
| 9,985,440 B1 * | 5/2018 | Okamura | H02J 5/00 |
| 10,033,220 B1 * | 7/2018 | Nguyen | H01F 38/00 |
| 2005/0037241 A1 | 2/2005 | Schneider et al. | |
| 2006/0208572 A1 | 9/2006 | Zansky et al. | |
| 2013/0099574 A1 * | 4/2013 | Bourgeois | H02J 9/062 307/66 |
| 2015/0318706 A1 | 11/2015 | Ilinca | |
| 2019/0052090 A1 * | 2/2019 | Kobayashi | H02J 3/383 |
| 2020/0313456 A1 * | 10/2020 | Song | H02J 9/061 |
| 2021/0237670 A1 * | 8/2021 | Takahara | H02J 7/0063 |

* cited by examiner

*Primary Examiner* — Hal Kaplan
*Assistant Examiner* — Joseph N Inge
(74) *Attorney, Agent, or Firm* — Gregory M. Nordstrom (57) ABSTRACT

A system comprises sets of batteries, each set having a power capacity less than a standup power capacity. The system is configured to couple the sets of batteries to power supplies to configure each of the power supplies with battery power less than the standup capacity. Responsive to a disruption of a first power supply, the system couples a first set of batteries, coupled to the first power supply, to a second power supply to couple to the second power supply battery power to not less than the standup power capacity. A method comprises coupling sets of batteries to power supplies to configure each of the power supplies to have less than a standup capacity. The method includes coupling sets batteries of one power supply to a second power supply to provide the second power supply with a battery capacity not less than the standup capacity.

20 Claims, 4 Drawing Sheets

DYNAMICALLY CONFIGURING BATTERIES IN A POWER SYSTEM

BACKGROUND

The present disclosure relates to batteries in power supply systems. More specifically, the present disclosure relates to battery connections among power supplies in a power system.

SUMMARY

According to embodiments of the present disclosure (hereinafter, "the disclosure"), a power system comprises a first and a second set of batteries, a first and second power supply, and connection configuration logic. In embodiments of the disclosure (hereinafter, "embodiments") the two sets of batteries each have a power capacity less than a standup capacity. The standup capacity is associated with a disruption in the power supplies to supply power to a power consumer The connection configuration logic couples the first set of the batteries to the first power supply and the second set of the batteries to the second power supply to configure each of the first and second power supplies to have battery power less than the standup capacity. The connection configuration logic receives a status of the first power associated with a disruption of the first power supply able to supply power to the power consumer. In response, the connection configuration logic couples the first set of batteries to the second power supply to configure the second power supply to have battery power with a power capacity not less than the standup capacity In some embodiments, based on a second status of the first power supply the connection configuration logic determines that the power supply has transitioned from the status associated with the disruption to a state associated with resumption of the first power supply able to supply power to the power consumer. In response, the connection configuration logic couples the first set of batteries to the first power supply. Embodiments can include the second power supply receiving power from a primary power source and the configuration connection logic detecting a disruption in the second power supply receiving the power from the primary power source. In response, the connection configuration logic configures the second power supply to receive power from the first and second sets of batteries to provide power to the power consumer.

In embodiments, the standup capacity can be based on a hold-up time corresponding to a period of time associated with a power consumer responding to a disruption of the power supplies to supply power to the power consumer. In some embodiment, the hold-up time is one a period of time for the power consumer to power down; a period of time for the power consumer to enter a state not requiring the power supplies to supply power to the power consumer; and, a period of time to resume one or both of the power supplies receiving primary power, from a primary power source, in association with a disruption of the first and the second power supplies receiving the primary power. Also, in some embodiments, the first status of the first power supply is one of a fault of the first power supply; a status corresponding to a service state of the first power supply; a fault in the coupling of the first set of batteries and the first power supply; and, a disruption of the first power supply receiving power, from a primary power source exclusive of the first set of batteries, to supply the first portion of the regulated power to the power Embodiments can perform a method to couple batteries to power supplies of a power system. According to the method, the power system couples a first set of batteries to a first power supply and a second set of batteries to a second power supply, each of the sets of batteries selected to have a power capacity less than a standup capacity, and each set coupled to the power supplies to particularly configure each power supply to have a power capacity less than the standup capacity. The method includes the power system determining a disruption in the first power supply to supply power to the power consumer and, in response, coupling the first set of batteries to the second power supply, to configure the second power supply to have a power capacity of the combined power capacities of the first and second sets of batteries. The first and second sets of batteries coupled to the second power supply particularly provide a combined power capacity not less than the standup capacity.

The method can include the power system determining that the first power supply has transitioned from the disruption of the first power able to supply to provide power to the power consumer, to resumption of the first power supply able to provide power to the power consumer. In response, the power system couples the first set of batteries to the first power supply.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure (hereinafter, "the disclosure) and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

Aspects of the present disclosure (hereinafter, "the disclosure") relate to batteries in electrical power (hereinafter, "power") systems. More particular aspects relate to dynamically configuring connections between batteries and power supplies in a power system. While the disclosure is not necessarily limited to such applications, various aspects of the disclosure may be appreciated through a discussion of various examples using this context.

Electronic and electrical systems or devices—such as computing systems, electronic instruments, electric engines, and so forth—can receive electrical power from a power system. Such electrical "power consumers" can require "regulated power" having particular electrical characteristics, such as a particular direct current (DC) and/or alternating current (AC) voltage or current, and/or AC frequencies and/or waveforms. Accordingly, a power consumer can include, or receive power from, a power system that can receive "primary power" from a "primary source" and convert the primary power to regulated power having the particular electrical characteristics required by a power consumer. Primary sources can include, for example, public power utilities and electrical power generators. However, this is not intended to limit embodiments and it would be understood by one of ordinary skill in the art that virtually any means of electrical power generation and/or storage can operate as a primary source.

In embodiments of the disclosure (hereinafter, "embodiments"), a power system can comprise a plurality of power supplies that can convert, or aid in converting, primary power to regulated power used by a power consumer. The power supplies can be configured, in a power system, to be redundant, such that one power supply can continue to provide regulated power in the event of a failure of one or more other power supplies within the power system.

Such power systems can further utilize batteries to temporarily provide alternate power to a power supply in the event that a power supply loses power from a power source (e.g., as a result of disconnection of the power supply from the power source, or a failure of the power source). As used herein, "battery power" refers to power provided from a battery to a power supply. The batteries can have power capacities (e.g., a watt-hour, and/or amp-hour capacity) capable of providing alternate primary power to a power supply for a particular "hold-up time". In embodiments, a hold-up time can be a period of time that a typical loss of primary power can be recovered, or a particular period of time that a power consumer requires to transition to a state in which it can tolerate loss of regulated power (e.g., power down, or enter a standby state not requiring a supply of regulated power).

Figure 1:
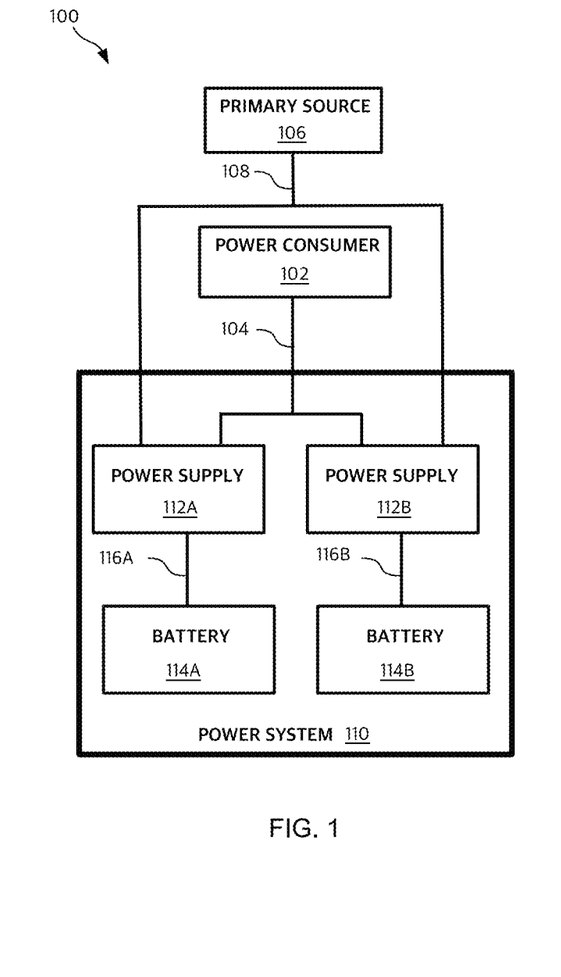
FIG. 1 illustrates an example power system, according to aspects of the disclosure.

FIG. 1 illustrates an example embodiment using a power system having a plurality of power supplies and batteries, according to aspects of the disclosure. In FIG. 1, example system 100 comprises power consumer 102, power system 110, and primary source 106. In embodiments, power consumer 102 can be, for example, a computing system, or component thereof, and primary source 106 can be, for example, public utility power. Power system 110 (e.g., as shown in the example of FIG. 1, power supplies 112A and 112B) can receive primary power, using power interface 108, from primary source 106, and power system 110 can convert the primary power to provide, via power interface 104, regulated power to power consumer 102. In embodiments, a "power interface" can be any form of electrical or electronic interface (e.g., a set of power polarity wires, or a set of power polarity wires with additional power conversion and/or regulation components) capable of transferring electrical power between two or more electrical or electronic components.

FIG. 1 further depicts power system 110 comprising power supplies 112A and 112B (collectively, "power supplies 112") coupled to respective batteries 114A and 114B (collectively, "batteries 114"). As previously described, batteries 114 can provide battery power to power supplies 112 in the event of a loss of primary power to one or both of power supplies 112A and 112B from primary source 106. As depicted in FIG. 1, battery 114A can provide battery power, buy means of power interface 116A, to power supply 112A and battery 114B can provide battery power, buy means of power interface 116B, to power supply 112B.

While the example of FIG. 1 illustrates a single power consumer coupled (by interface 104) to power system 110, this is not intended to limit embodiments. It would be apparent to one of ordinary skill in the art that a system (such as 100 in FIG. 1) can comprise a plurality of power consumers, such as 102, and a plurality of power interfaces (such as 104) to provide regulated power from the power system to the power consumers. For example, in an embodiment power supply 112A could be configured to provide regulated power to power consumer 102 (via power interface 104) and power supply 112B could be configured to provide regulated power to a second power consumer (not shown in FIG. 1) via a second power interface (not shown in FIG. 1) similar to 104. In such an embodiment the regulated power provided to power consumer 102 can be the same as, or can differ from, that provided to the second power consumer.

In the example of power system 110, in FIG. 1, each battery is depicted as statically connected (by respective power interfaces 116A and 116B) to a corresponding power supply: 114A to 112A and 114B to 112B. In such a configuration of batteries and power supplies each paired battery and power supply can be said to be "conjoint", that is battery 114A is conjoint with power supply 112A, and battery 114B is conjoint with power supply 112B. In such embodiments, each battery can have a "standup power" capacity corresponding to power required by its conjoint power supply to provide regulated power to a power consumer. As used herein, "standup power" refers to power that a battery can provide to a power supply to enable the power supply to continue to provide regulated power to a power consumer for a particular hold-up time.

Additionally, each battery in power system 110 can receive power to charge, and/or maintain a charge (hereinafter, "charge power") from its conjoint power supply. In embodiments, a battery can receive charge power over a power interface. For example, in embodiments, a power interface can comprise wires to both provide battery power from a battery to a power supply and to provide charge power from the power supply (or, alternate source of charge power) to the battery. The wires can be the same wires or can be different wires; for example, a power interface, such as 116A and/or 116B in FIG. 1A, can be one set of wires conveying both battery and charge power, alternately, or can be two sets of wires, one to provide batter and one set to provide charge power. Accordingly, considering interfaces 116A and 116B, in FIG. 1, to be capable of conveying both battery and charge power, battery 114A can receive charge power from power supply 112A via power interface 116A and battery 114B can receive charge power from power supply 112B via power interface 116B.

It can be seen from the example of power system 110 in FIG. 1 that, in a power system a failure of a power supply (e.g., 112A) can leave a conjoint battery (e.g., 114A) unable to provide (by means of the conjoint power supply) power stored in the battery to other components of the power system, and/or can leave a battery isolated from a source of charge power (e.g., the failed conjoint power supply) such that the battery may, ultimately, experience diminished or complete loss of standup power capacity.

Accordingly, in embodiments a reconfigurable power system can dynamically detect a change of state of a power supply, such as from an "operational" to a "degraded" state, and vice-versa. In embodiments, an operational state can comprise any state of the power supply in which it can provide, or is actively providing, regulated power to a power consumer and/or charge power to a battery. Conversely, a degraded state of a power supply can comprise any state of a power supply in which it is not providing, or cannot provide either or both of regulated and charge power, or cannot provide these at nominal requirements of a consumer and/or battery.

In embodiments, a degraded state can comprise a state in which the power supply is operating, but at degraded capacity. Additionally, or alternatively, a degraded state can comprise a state in which the power supply is no longer operating, such as in a powered-off or failure state. For example, in embodiments a power supply can transition to a degraded state as a result of a component failure within or auxiliary to the power supply, as a result of a thermal failure (e.g., a failure of a cooling fan), and/or removal of the power supply from operation for service.

Accordingly, in response to such a change of state a reconfigurable power system can dynamically reconfigure connections between batteries and power supplies of a power system. For example, in response to a change of state of a power supply from operational to degraded (e.g., a failure of a power supply), a reconfigurable power system can reconfigure a battery connected (via one power interface) to that power supply (e.g., a battery conjoint with that power supply) to connect (via an alternate power interface) to one more other power supplies (e.g., one or more other power supplies in an operational state). Similarly, in response to a change of state of a power supply from degraded to operational (e.g., completion of service of the power supply), a reconfigurable power system can reconfigure a battery connected (via an alternate power interface) to a second power supply to connect (via a previously conjoint power interface or, alternatively, another power interface of the power system) to the power supply that has transitioned to an operational state.

Figure 2A:
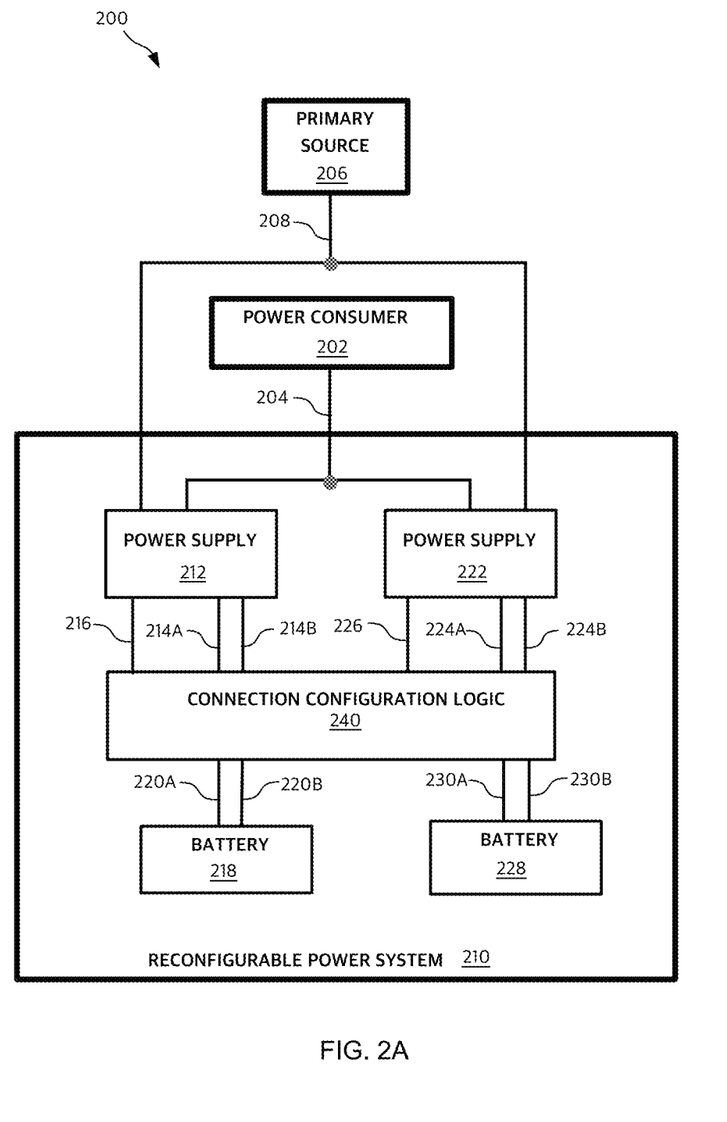
FIG. 2A illustrates an example embodiment of a reconfigurable power system, according to aspects of the disclosure.

FIG. 2A illustrates an example embodiment using a reconfigurable power system that can dynamically manage connections between batteries and power supplies of the power system in response to changes in states of power supplies. Similar to example system 100 of FIG. 1, in FIG. 2A, example system 200 comprises power consumer 202, reconfigurable power system 210 (hereinafter, "power system 210"), and primary source 206. As previously described in reference to FIG. 1, power consumer 202 can be, for example, a computing system, or component thereof, and primary source 206 can be, for example, a public power utility. Power system 210 can receive primary power, using power interface 208, from primary source 206, and power system 210 can convert the primary power to provide, via power interface 204, regulated power to power consumer 202. While the example of FIG. 2A depicts batteries 218 and 228 receiving primary power from a common power interface (208), this is not intended to limit embodiments. It would be apparent to one of ordinary skill in the art that each of batteries 218 and 228 can receive primary power from different power interfaces (not shown in FIG. 2A) to primary source 206, or that each of batteries 218 and 228 can receive primary power from different primary sources (also not shown in FIG. 2A).

Also similar to example system 100 of FIG. 1, in FIG. 2A power system 210 comprises power supplies 212 and 222 and batteries 218 and 228. As previously described, batteries 218 and 228 can provide battery power to power supplies 212 and 222 in the event of a loss of primary power, to one or both of 212 and 222, from primary source 206. However, in the example embodiment of FIG. 2A, power system 210 further includes connection configuration logic 240 interconnected between the batteries and power supplies of power system 210. In power system 240, interfaces 220A and 220B (collectively, "interfaces 220"), interfaces 230A and 230B (collectively, "interfaces 230"), interfaces 214A and 214B (collectively, "interfaces 214"), and, and interfaces 224A and 224B (collectively, "interfaces 224") can be power interfaces, such as previously described, which can provide battery power from a battery to a power supply and/or which can provide charge power from a power supply to a battery.

As used herein, "battery power interface" refers to a power interface to provide battery power from a battery of a reconfigurable power system to a power supply of such a system and "battery charge interface" refers to a power interface to provide charge power to a battery of a reconfigurable power system from a power supply of such a system. In an embodiment, as shown in FIG. 2A, connection configuration logic can connect a battery power interface of a battery to battery power interfaces of power supplies of a reconfigurable power system, and can connect a battery charge interface of a battery to battery charge interfaces of the power supplies.

Alternatively, in an embodiment, connection configuration logic, such as 240 in FIG. 2A, can connect a single "supply" power interface between a battery and connection configuration logic, and a single supply power interface between a power supply and connection configuration logic. Such supply power interfaces can both provide battery power from a battery to the power supplies and provide charge power to the battery from the power supplies. Accordingly, as used herein, "supply interface" refers to a single power interface that can both provide battery power from a battery to a power supply and provide charge power to the battery from a power supply. In embodiments, using the example of FIG. 2A, interfaces 220A, 214A, 230A, and 224A can be such supply interfaces and interfaces 220B, 214B, 230B, and 224B can be omitted. It will be appreciated by one of ordinary skill in the art that in the ensuing description of FIG. 2A, all references to interfaces 220B, 214B, 230B, and 224B can be omitted in consideration of embodiments utilizing single supply interfaces between batteries and power supplies of a reconfigurable power system.

In embodiments, connection configuration logic 240 can connect battery interfaces 220 and/or 230 to interfaces 214 and/or 224, to connect batteries 218 and 228 with power supplies 212 and 222, to provide battery power from batteries 218 and 228 to power supplies 212 and 222, and/or to provide charge power from power supplies 212 and 222 to batteries 218 and 228. For example, connection configuration logic 240 can establish a "default route" connection between interface 220A and interface 214A to provide battery power from battery 218 to power supply 212. Similarly, connection configuration logic 240 can establish a default route connection between interface 214B and interface 220B for battery 218 to receive charge power from power supply 212. Connection configuration logic 240 can make similar default route connections between interfaces 230A and 224A, and 224B and 230B, to enable battery 228 to provide battery power to power supply 222 and, respectively, for power supply 222 to provide charge power to battery 228.

Interfaces 216 and 226, in FIG. 2A, can be status interfaces that can communicate power supply states from power supplies 212 and 222, respectively, to connection configuration logic 240, to indicate a transition of a power supply form operational to degraded state, or vice versa. In embodiments, in response to such a transition in one power supply, connection configuration logic, such as 240 can establish an alternate, "redundant route", connection between a battery and a power supply. For example, with batteries 218 and 228 and power supplies 212 and 222 connected by the default route connections just described, in response to a transition of power supply 212 from operational to degraded state, connection configuration logic 240 can establish a redundant route connection between power interface 220A and power interface 224A, to provide battery power from battery 218 to power supply 222, and/or 220B and 224B to supply charge power from power supply 222 to battery 218. With battery 218 connected in this redundant route configuration to power supply 222, in response to a transition in power supply 212 from degraded state to operational, connection configuration logic can reconnect battery 218 to power supply 212 using the default route connections between power interface 220A and 214A and 220B and 214B.

Similarly, in response to a transition of power supply 222 from operational to degraded state, connection configuration logic 240 can establish a redundant route connection between power interface 230A and power interface 214A, to provide battery power from battery 228 to power supply 212, and/or 230B and 214B, to supply charge power from power supply 212 to battery 228. With battery 228 connected to power supply 212 using the redundant route connection, in response to a transition in power supply 222 from degraded state to operational, connection configuration logic can reconnect battery 228 to power supply 222 using the default route connections between power interface 230A and 224A and 230B and 224B.

In embodiments, a reconfigurable power system, such as 210 of FIG. 2A, can utilize batteries having the same or, alternatively, different power capacities, according to battery power requirements of the power supplies to which they are connected (e.g., by means of connection configuration logic, such as 240). To illustrate, in the example embodiment of FIG. 2A, power supplies 212 and 222 can require a battery power (i.e., power received from a battery among 218 and 228) capacity of, say, 100 watt-hours (e.g., to enable each of power supplies 212 and 222 to provide a particular regulated power capacity to power consumer 102).

Alternatively, power supply 212 can require a battery power capacity of, say, 100 watt-hours (e.g., to enable power supply 212 to provide a particular regulated power capacity to power consumer 102), while power supply 222 can require a battery power capacity of, say, 50 watt-hours (e.g., to enable power supply 222 to provide a particular regulated power capacity to a different power consumer, not shown in FIG. 2A). As previously described, such a battery power capacity requirement can correspond to a particular hold-up time the power supply must provide regulated power when drawing battery power, such as in the event of a loss of primary power.

It can be seen from this example that, in embodiments, when connection configuration logic (e.g., 240 in FIG. 2A) establishes a redundant route connection between a battery (e.g., 218, in FIG. 2A) to an alternate power supply (222), in electrical parallel with a connection between that alternate power supply and another battery (e.g., 228 in the default route of power system 210 just described), that the alternate power supply can receive the combined battery power capacity of both batteries. Using the example of batteries 218 and 228 each having a 200 watt-hour capacity, battery 218 connected to power supply 222, by means of a redundant route connection between interfaces 220 and 224 in parallel with a connection between interfaces 230 and 224, provides power supply 222 with a combined battery power capacity of 200 watt-hours.

Similarly, in the example case that battery 212 has a 100 watt-hour capacity and battery 218 has a 50 watt-hour capacity, a configuration connecting both of batteries 218 and 228 to power supply 222 can provide power supply 222 with a combined 150 watt-hours of battery power capacity. In the case that the battery power capacity corresponds, for example, to a hold-up time, this configuration of batteries 218 and 228 both providing battery power to power supply 222 can have the advantage of doubling (200 watt-hour combined) or tripling (150 watt-hour combined) the hold-up time for which power supply 222 can provide regulated power in the event of a loss of primary power.

In some embodiments, a reconfigurable power system can utilize batteries having a reduced power capacity, such as a power capacity less than a capacity required to meet a particular hold-up time. For example, with reference again to FIG. 2A, each of batteries 218 and 228 can have, say, 50 watt-hours of battery power capacity, while power consumer 202 can require power system 210 to provide a hold-up time corresponding to a 100 watt-hour alternate battery power capacity. In the event that power supply 212, for example, transitions to degraded state, and/or loses primary power from primary source 206 (or, alternatively, from a different primary source providing primary power to power supply 212), connection configuration logic 240 can connect interface 220 to interface 240 (e.g., electrically in parallel with a connection between interface 230 and interface 224). In this configuration, batteries 218 and 228 can provide a combined 100 watt-hour capacity to power supply 222, such that power system 210 can provide the 100 watt-hour capacity to meet the hold-up time requirement of power consumer 202, in the event that power supply 222 also loses primary power from primary source 206.

Figure 2B:
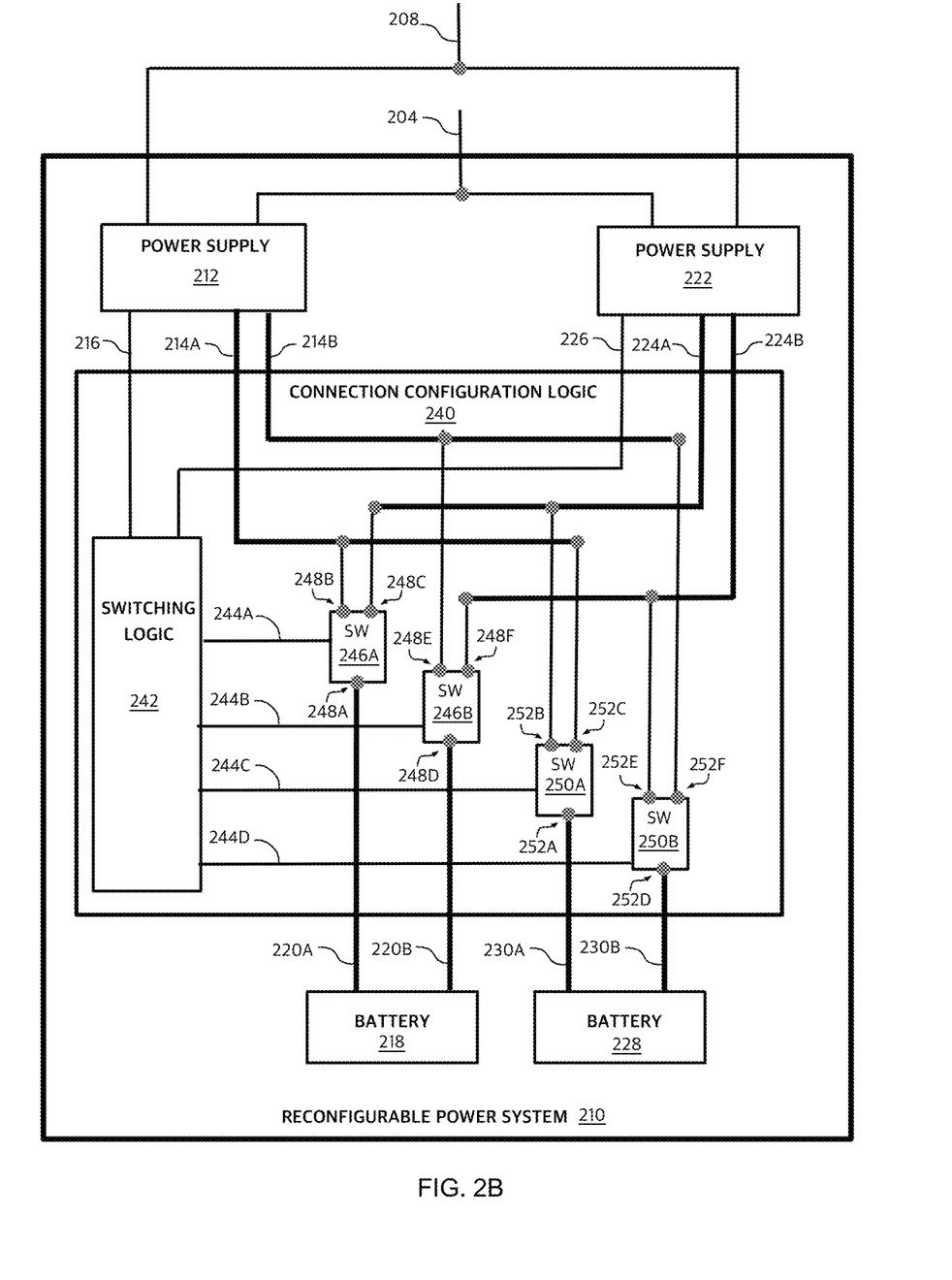
FIG. 2B illustrates an example embodiment of connection configuration logic of a reconfigurable power system, according to aspects of the disclosure.

Using the example reconfigurable power system 210 of FIG. 2A, FIG. 2B illustrates an example embodiment of connection configuration logic 240 that can receive power supply status and reconfigure connections between batteries and power supplies of a reconfigurable power system. FIG. 2B depicts connection configuration logic 240, of power system 210 in FIG. 2A, as comprising switching logic 242 and switches SW 246A and SW 246B (collectively, "switches 246"), and switches SW 250A and SW 250B (collectively, "switches 250"). Switch 246A comprises contacts 248A, 248B, and 248C, switch 246B comprises contacts 248D, 248E, and 248F, switch 250A comprises contacts 252A, 252B, and 252C, and switch 252B comprises contacts 252D, 252E, and 252F. In embodiments, switches 246 and/or switches 250 can be, for example, double-throw switches or relays that can make connections between interfaces 220A and 220B and interfaces 248, and/or between interfaces 230A and 230B and interfaces 252. However, this is not intended to limit embodiments and it would be understood that switches, in embodiments, can comprise any form of electrical switch suitable for connecting power interfaces.

As shown in FIG. 2B, contacts 248A and 248D connect switches 246A and 246B, respectively, to respective power interfaces 220A and 220B of battery 218. In embodiments, interface 220A can be, for example, a battery power interface, to provide battery power from battery 218 to a power supply among power supplies 212 and 222, and interface 220B can be, for example, a battery charge interface, to provide charge power to battery 218 from a power supply among power supplies 212 and 222.

Similarly, contacts 252A and 252D connect switches 252A and 252B, respectively, to respective power interfaces 230A and 230B of battery 228. In embodiments, interface 230A can be a battery power interface to provide battery power from battery 228 to a power supply among power supplies 212 and 222, and interface 230B can be a battery charge interface to provide charge power to battery 218 from a power supply among power supplies 212 and 222.

Further, contact 248B connects SW 246A to power interface 214A of power supply 212, contact 248C connects SW 246A to power interface 224A of power supply 222, contact 248E connects SW 246B to power interface 214B of power supply 212, and contact 248F connects SW 246B to power interface 224B of power supply 222. Similarly, contact 252B connects SW 250A to power interface 214A of power supply 212, contact 252C connects SW 250A to power interface 224A of power supply 222, contact 252E connects SW 250B to power interface 214B of power supply 212, and contact 252F connects SW 250B to power interface 224B of power supply 222. In embodiments, interfaces 214A and 224A can be a battery power interface to receive battery power from a battery among batteries 218 and 228, and interfaces 214B and 224B can be battery charge interfaces to provide charge power to a battery among batteries 218 and 228.

Accordingly, switches 246 can connect battery power and charge interfaces of battery 218 to respective battery power and charge interfaces of either of power supplies 212 and 222, based on the setting of switch 246A to connect interface 220A to interfaces 214A or 224A, and/or the setting of switch 246B to connect interface 220B to interfaces 214B or 224B. Similarly, switches 250 can connect battery power and charge interfaces of battery 228 to respective battery power and charge interfaces of either of power supplies 212 and 222, based on the setting of switch 252A to connect interface 230A to interfaces 214A or 224A, and/or the setting of switch 250B to connect interface 230B to interfaces 214B or 224B.

In FIG. 2B, switching logic 242 connects to switches 246A, 246B, 250A, and 250B by means of respective control interfaces 244A, 244B, 244C, and 244D (collectively, "interfaces 244"). In embodiments, switching logic 242 can utilize control interfaces among interfaces 244 to set switches among switches 246 and 250 to establish connections between power interfaces of batteries 218 and 228 and power supplies 212 and 222. For example, to establish a default route connection for battery 218 to provide battery power to power supply 212, using interface 244A switching logic 242 can connect interface 220A to interface 214A of power supply 212 by setting SW 246A to connect contact 248A to contact 248B. To establish a default route connection for battery 218 to receive charge power from power supply 212, using interface 244B switching logic 242 can connect interface 220B to interface 214B of power supply 212 by setting SW 246B to connect contact 248D to contact 248E.

Similarly, to establish a default route connection for battery 228 to provide battery power to power supply 222, using interface 244C switching logic 242 can connect interface 230A to interface 234A of power supply 232 by setting SW 250A to connect contact 252A to contact 252B. To establish a default route connection for battery 228 to receive charge power from power supply 222, using interface 244D switching logic 242 can connect interface 230B to interface 224B of power supply 222 by setting SW 250B to connect contact 252D to contact 252E.

While not shown in FIG. 2B, in embodiments power system 210 can include alternative power interfaces to provide charge power from power supplies (e.g., 212 and/or 222) of power system 210 to batteries (e.g., 218 and/or 228) of power system 210, and connection configuration logic 240 can include additional switches to establish connections between the power interfaces providing charge power to the batteries. Additionally, as previously described, in embodiments power interfaces to provide battery power from a battery to a power supply, and to provide charge power from a power supply to a battery, need not be independent interfaces. With reference to FIG. 2B, for example, in an alternative embodiment, power interfaces 220A, 214A, and 224A can provide both battery power from battery 218 to power supply 212 or 222 and provide charge power from power supplies 212 or 222 to battery 218, such that interfaces 220B, 214B, and 224B, along with switch 246B, can be omitted, and similarly for interfaces 230B 214B, and 224B, along with switch 250B.

In embodiments, switching logic 242 can receive power supply status from power supplies 212 and 222 via respective status interfaces 216 and 226. In response to a change in status of the power supplies, switching logic 242 can change the states of switches among switches 246 and switches 250 to establish alternative connections between the batteries and power supplies. For example, in response to a change in the state of power supply 212 from operational to degraded, switching logic 242 can open the SW 246A connection between contacts 248A and 248B, to break a default route connection between battery 218 interface 220A and power supply 212 interface 214A. Switching logic 242 can then establish a redundant route connection between battery 212 interface 220A and power supply 222 interface 224A by setting switch 246A to connect contact 248A to contact 248C.

Additionally, or alternatively, in response to a change in the state of power supply 212 from operational to degraded, switching logic 242 can open the SW 246B connection between contact 248D and 248E, to break the default route connections between battery 218 interface 220B and power supply 212 interface 214B. Switching logic 242 can then establish a redundant route connection between battery 212 interface 220B and power supply 222 interface 224B by setting switch 246B to connect contact 248D to contact 248F. It would be apparent to one of ordinary skill in the art that switching logic 242 can perform similar switching to establish default route and/or redundant route connections between battery 228 and power supplies 222 and 212.

In embodiments, in response to a change in a power supply state, connection configuration logic of a reconfigurable power system can establish a redundant route connection for a battery to provide battery power to an alternate power supply, but not necessarily establish a redundant route connection for the battery to receive charge power from the alternate power supply, or vice-versa. Thus, in an embodiment switching logic 242, for example, can, optionally, switch connections of switch 246A, to establish a redundant route connection between interface 220A and 224A but not switch connections of 246B from a default route connection between interface 220B and 214B, and vice versa.

As just described, in response to a change in a power supply state from operational to degraded, embodiments of a reconfigurable power system can switch power interfaces between batteries and power supplies from a default route to a redundant route. While configured to have redundant route connections, a power supply can change from a degraded state to an operational state. For example, a power supply can change from an operation state to a degraded state as a result of a component failure and, following repair of the failed component, the power supply can return to an operational state. In another example, a power supply can change from an operational state to a degraded state due to a thermal condition (e.g., over-temperature) and, as a result of the thermal condition changing to a nominal thermal state, the power supply can change from the degraded state to an operational state.

Accordingly, a reconfigurable power system can switch power interfaces between batteries and power supplies from a redundant route to a default route. To illustrate, again using the example embodiment of FIG. 2B, with power supply 212 in a degraded state and battery 218 connected by switches 246A and/or 246B to power supply 222, switching logic 242 can receive an indication from power supply 212, via status interface 216, that power supply 212 has transitioned from the degraded state to operational state. In response, switching logic 242 can set switch 246A to disconnect contacts 248A and 248C, and/or contacts 248D and 248F, to break one or both of the redundant route connections between battery 218 and power supply 222, and set switch 246A to connect contact 248A to 248C, and/or contact 2248D to 248E, to establish one or both of the default route connections between battery 218 and power supply 212.

While the examples of FIGS. 2A and 2B depict connection configuration logic, such as 240, included in a reconfigurable power system, such as 210, this is not intended to limit embodiments. For example, connection configuration logic 240, in FIGS. 2A and 2B, can be distributed between power system 210 and, for example, a power consumer such as 202 in FIG. 2A, or can be included in a power consumer (e.g., in an element of a computing system that utilizes a reconfigurable power system, such as 210). In another example, connection configuration logic 240 or switching logic 242, in FIG. 2B, can be included in, or distributed among batteries and/or power supplies of a reconfigurable power system. It would be apparent to one of ordinary skill in the art that such connection configuration logic, and/or components thereof, can be embodied in various elements of a system associated with, and/or coupled to, a reconfigurable power system according to the structure of such systems and/or components of such systems.

Further, while FIG. 2B depicts connection configuration logic 240 as configured to connect two batteries (218 and 228) among two power supplies (212 and 222), this is also not intended to limit embodiments. As previously described, in embodiments a reconfigurable power system can comprise a plurality of batteries and/or power supplies and it would be apparent to one of ordinary skill in the art how to modify the examples of FIGS. 2A and 2B accordingly. Similarly, it would be apparent to one of ordinary skill in the art that a reconfigurable power system need not include a plurality of batteries, but can, alternatively, comprise a single battery that the system can switch between a plurality of power supplies, and that the plurality of power supplies can comprise more than the two power supplies illustrated in the example embodiments of FIGS. 2A and 2B. In such embodiments, switches of connection configuration logic can comprise, for example, switches having more than 3 contacts as illustrated in the example switches of FIG. 2B (e.g., a switch can have 4 contacts, one contact to connect to a battery, and 3 contacts to connect to each of 3 respective power supplies) and/or can comprise switches cascaded in a configuration to enable a battery to connect to a plurality of power supplies greater than 2.

Additionally, while the example embodiments of FIGS. 2A and 2B describe switching battery power and/or battery charge interfaces between a battery and a plurality of power supplies, this too is not intended to limit embodiments. It would be apparent to one of ordinary skill in the art to anticipate that a reconfigurable power system can additionally, or alternatively, switch other types of interfaces between a battery and two or more power supplies. For example, in an embodiment a battery can have a status interface to the power supplies, such as to provide battery status to a power supply, and a reconfigurable power system can switch the status interface among the power supplies.

Figure 3:
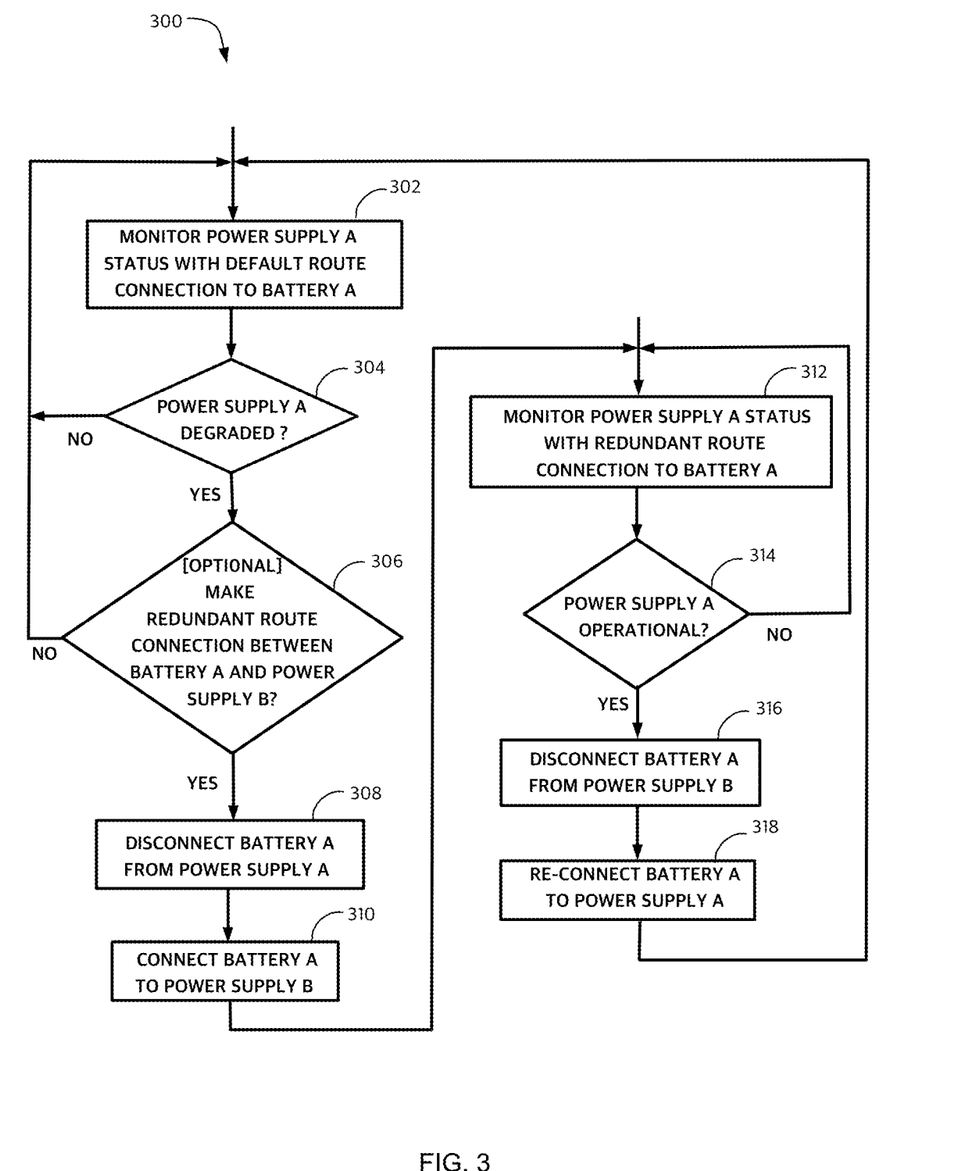
FIG. 3 is a flowchart that illustrates an example method to reconfigure connections between batteries and power supplies of a reconfigurable power system, according to aspects of the disclosure.

In embodiments, reconfigurable power systems, such as the example of FIGS. 2A and 2B, can perform a method to manage configuration of batteries and power supplies of the power system. FIG. 3 illustrates example method 300 that a reconfigurable power system can perform to dynamically manage connections between batteries and power supplies of that power system. For purposes of illustrating the disclosure, but not intended to limit embodiments, method 300 is described as performed by a reconfigurable power system (hereinafter, for purposes of describing the method, "the power system"), such as the examples of FIGS. 2A and 2B.

Further, for purposes only of illustrating the method and also not intended to limit embodiments, the description of FIG. 3 supposes a configuration of the power system comprising a "battery A" having a default route connection to a "power supply A", and a "battery B" having a default route connection to a "power supply B". The example further supposes that the power system can switch the battery and power supply connections from the default route connections to redundant route connections between battery A and power supply B, and/or batter B and power supply A. In describing the method, it will be understood that the default and redundant route connections can comprise a connection for a battery to provide battery power to a power supply, and/or a connection for a battery to receive charge power from a power supply.

At step 302 of method 300, the power system monitors the status of the battery with the battery connected, in the default route, to power supply. For example, at 302 connection configuration logic of the power system can receive power supply A status that can indicate a state (e.g., operational and/or degraded state) of the power supply. Based on the status monitored at 302, at step 304 the power system determines if power supply A has transitioned to a degraded state, such as previously described.

If, at 304, the power system determines that power supply A has not transitioned to a degraded state, the power system continues at step 302 to monitor the status of power supply A. Alternatively, if the power system determines, at 304, that power supply A has transitioned to a degraded state, at step 306 the power system determines whether or not to make a redundant route connection between battery A and power supply B. For example, at step 306 the power system can determine that there is a redundant route connection (such as illustrated in the example of FIG. 2B between batteries 218 and 228 and power supplies 212 and 222) between battery A and power supply B and can determine to connect the battery to power supply B using that connection.

Optionally, in embodiments, the power system can perform step 306 to determine whether or not to make a redundant route connection between battery A and power supply B. For example, the power system can determine, at 306, if there is a redundant route connection available to connect battery A to power supply B, and/or whether or not power supply B is in a state (e.g., an operational state) that is of benefit to the power system (e.g., to enable battery A to provide battery power to, and/or draw charge power from, power supply B) to connect battery A to power supply B. In embodiments, a power supply (e.g., power supply B in the example) need not be limited to an operational state to be of benefit to the power system to connect a battery (e.g., battery A) to that power supply (e.g., power supply B). It would be apparent to one of ordinary skill in the art that a power supply can have a variety of states, other than an operational state, that can provide benefit to the power system to make a redundant route connection between a battery and that power supply.

At step 306, if the power system determines not to switch battery A from a connection to power supply A, to a connection to power supply B (e.g., because power supply B is in a state in which switching the battery to power supply B has no benefit), at 302 the power system continues to monitor the state of power supply A as connected to power supply A. In embodiments, the power system can repeat steps 302, 304, and 306 while power supply A remains in a degraded state and, in the event that power supply A transitions back to an operational state, can continue to perform step 302 to continuously monitor the status of power supply A.

Alternatively, if the power system determines, at step 306, to switch battery A to power supply B or, if the power system does not perform optional step 306, at step 308 the power system disconnects battery A from power supply A (e.g., breaks the default route connection between battery A and power supply A) and, at step 310, connects battery A to power supply B (e.g., establishes the redundant route connection between battery A and power supply B). In embodiments, the power system can perform steps 308 and 310 using, for example, connection configuration logic such as the example of connection configuration logic 240 in FIG. 2B.

At step 312, the power system monitors the status of power supply B, with the battery and power supply B connected by a redundant route connection. For example, at 312 connection configuration logic of the power system can receive power supply A status that can indicate a state (e.g., operational and/or degraded state) of the power supply. Based on the status monitored at 312, at step 314 the power system determines if power supply A has transitioned back to an operational state. As previously described, in embodiments, a power supply can transition from a degraded to an operational state as a result of, for example, a service operation that remedies a failure or defect in the power supply, and/or a component of or coupled to the power supply, and/or a change in an environmental condition of the power supply, such as an electrical and/or thermal state out of a nominal range of states. A power supply can transition to a degraded state as a result of loss of primary power and can subsequently transition back to an operational state if primary power is restored.

At 314, if the power system determine that power supply A has transitioned back to an operational state, at 316 the power system disconnects battery A from power supply B (e.g., breaks the redundant route connection between battery A and power supply B) and, at step 318, re-connects battery A to power supply A, using the default route connection between battery A and power supply A, and repeats steps 302 and 304 with battery A reconnected in the default route to power supply A. As described with reference to steps 308 and 310, in embodiments the power system can perform steps 316 and 318 using, for example, connection configuration logic such as the example of connection configuration logic 240 in FIG. 2B.

Alternatively, if the power system determines, at 314, that power supply A has not transitioned back to an operational state, at 312 the power system continues to monitor power supply A for a change in state to an operational state. In embodiments, at 312, the power system can monitor power supply for states other than operational and, at 314, can determine that power supply A has transitioned to a state (other than operational) in which it can be beneficial to disconnect battery A from power supply B and re-connect battery A to power supply A. For example, the power system can determine, at 314, that battery A is connected to power supply B in order to receive charge power from power supply B, but that power supply B does not need battery A to provide battery power for power supply B to meet its hold-up time requirements during loss of primary power. Accordingly, at 314, the power system can determine that power supply A has transitioned from a degraded state to a state in which it can, at least, provide charge power to battery A, such that the power system can determine at 314 to perform steps 316 and 318. Subsequent to, or in conjunction with 318, at 302 the power system performs step 302, to monitor the status of power supply A with battery A connected to power supply A.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system, the system comprising:
a first and a second power supply, the first and the second power supplies configured to supply regulated power to a power consumer, the regulated power having electrical power characteristics corresponding to an electrical power requirement of the power consumer;
a first and a second set of batteries, the first set of batteries particularly selected based on the first set of batteries having, in combination, a first power capacity less than a standup power capacity, the second set of batteries particularly selected based on the second set of batteries having, in combination, a second power capacity less than the standup power capacity, the standup power capacity based on a hold-up time, the hold-up time corresponding to a period of time associated with the power consumer responding to a disruption of the first and second power supplies to supply the regulated power to the power consumer; and,
connection configuration logic configured to:
couple the first set of batteries to the first power supply to particularly configure first battery power, less than the standup capacity, coupled to the first power supply;
couple the second set of batteries to the second power supply to particularly configure second battery power, less than the standup capacity, coupled to the second power supply;
detect a first status of the first power supply, the first status of the first power supply corresponding to a disruption of the first power supply able to supply the regulated power to the power consumer; and, responsive to the detecting the first status of the first power supply, couple the first set of batteries to the second power supply, in combination with the second set of batteries coupled to the second power supply, to combine the first power capacity of the first set of batteries with the second power capacity of the second set of batteries to particularly configure third battery power, having a first combined power capacity, coupled to the second power supply, not less than the standup capacity.

2. The system of claim 1, wherein the second power supply is further configured to receive primary power from a primary power source, the primary power source exclusive of the first and the second set of batteries; and, wherein the connection configuration logic is further configured to:

detect a disruption of the second power supply receiving the primary power; and, responsive to the detecting the disruption of the second power supply receiving the primary power, and based on the first set of batteries coupled to the second power supply, configure the second power supply to receive the third battery power to supply the regulated power to the power consumer.

3. The system of claim 1, wherein the connection configuration logic is further configured to:

detect a second status of the first power supply, the second status of the first power supply corresponding to a transition of the first power supply from the disruption of the first power supply able to supply the regulated power to the power consumer to a resumption of the first power supply able to supply the regulated power to the power consumer; and, responsive to the detecting the second status of the first power supply and the first set of batteries coupled to the second power supply, couple the first set of batteries to the first power supply.

4. The system of claim 1, wherein the first power supply is further configured to supply charging power to batteries among the first set of batteries coupled to the first power supply.

5. The system of claim 1, wherein the second power supply is further configured to supply charging power to batteries among the first and second set of batteries coupled to the second power supply.

6. The system of claim 1, wherein the system further comprises a status interface communicatively coupled to the first power supply and to the connection configuration logic; and, wherein the connection configuration logic configured to detect the first status of the first power supply comprises the connection configuration logic further configured to receive the first status of the first power supply from the first power supply via the status interface.

7. The system of claim 1, wherein the first status of the first power supply is selected from a group consisting of: a fault of the first power supply; a status corresponding to a service state of the first power supply; a fault in the coupling of a battery, among the first set of batteries, and the first power supply; and, a disruption of the first power supply receiving power, from a primary power source exclusive of the first set of batteries, to supply the first portion of the regulated power to the power consumer.

8. The system of claim 1, wherein the hold-up time further corresponds to a period of time selected from a group consisting of: a period of time for the power consumer to power down; a period of time for the power consumer to enter a state not requiring the first power supply to supply the regulated power and the second power supply to supply the regulated power; and, a period of time to resume at least one of the first and the second power supplies receiving primary power, from a primary power source exclusive of the first and the second set of batteries, in association with a disruption of the first and the second power supplies receiving the primary power.

9. The system of claim 1, wherein the connection configuration logic is further configured to:

detect a first status of the second power supply, the first status of the second power supply corresponding to a disruption of the second power supply able to supply the regulated power to the power consumer; and, responsive to the detecting the first status of the second power supply, couple the second set of batteries to the first power supply, in combination with the first set of batteries coupled to the first power supply, to combine the second power capacity of the second set of batteries with the first power capacity of the first set of batteries to particularly configure fourth battery power, having a second combined power capacity not less than the standup capacity, coupled to the first power supply.

10. The system of claim 9, wherein the first power supply is further configured to receive primary power, from a primary power source exclusive of the first and the second set of batteries, to supply the regulated power to the power consumer; and, wherein the connection configuration logic is further configured to:

detect a disruption of the first power supply receiving the primary power; and, responsive to the detecting the disruption of the first power supply receiving the primary power, and based on the second set of batteries coupled to the first power supply, configure the first power supply to receive the fourth battery power to supply the regulated power to the power consumer.

11. The system of claim 9, wherein the connection configuration logic is further configured to:

detect a second status of the second power supply, the second status of the second power supply corresponding to a transition of the second power supply from the disruption of the second power supply able to supply the regulated power to the power consumer to a resumption of the second power supply able to supply the regulated power to the power consumer; and, responsive to the detecting the second status of the second power supply, and based on the second set of batteries coupled to the first power supply, couple the second set of batteries to the second power supply.

12. The system of claim 9, wherein the system further comprises a status interface communicatively coupling at least one of the first power supply and the second power supply to the connection configuration logic; and, wherein the connection configuration logic configured to detect at least one of the first status of the first power supply and the first status of the second power supply comprises the connection configuration logic further configured to receive at least one of the first status of the first power supply and the first status of the second power supply via the status interface.

13. A method, the method comprising:
supplying, by a power system, regulated power to a power consumer electrically coupled a first and a second power supply, the regulated power having electrical power characteristics corresponding to an electrical power requirement of the power consumer;
electrically coupling, by the power system, a first set of batteries, particularly selected to have a first battery capacity less than a standup power capacity, to the first power supply to particularly configure first battery power, coupled to the first power supply, having less than the standup power capacity, the standup power capacity based on a hold-up time, the hold-up time corresponding to a period of time associated with the power consumer responding to a disruption of the first and second power supplies to supply the regulated power to the power consumer;
electrically coupling, by the power system, a second set of batteries, particularly selected to have a second battery capacity less than the standup power capacity, to the second power supply to particularly configure second battery power, coupled to the second power supply, having less than the standup power capacity;
determining, by the power system, a first status of the first power supply, the first status of the first power supply corresponding to a disruption of the first power supply able to supply the regulated power to the power consumer; and,
in response to the power system determining the first status of the first power supply, the power system coupling the first set of batteries to the second power supply, in combination with the second set of batteries coupled to the second power supply, to combine the first power capacity of the first set of batteries with the second power capacity of the second set of batteries, to particularly configure third battery power, having a first combined power capacity, coupled to the second power supply, not less than the standup capacity.

14. The method of claim 13, the method further comprising:
detecting, by the power system, a disruption of a primary power source supplying primary power to the second power supply, the primary power source exclusive of the first and the second set of batteries; and,
in response to the power system detecting the disruption of the primary power source supplying the primary power to the second power supply, and based on the first set of batteries coupled to the second power supply, the power system configuring the second power supply to receive the third battery power to supply the regulated power to the power consumer.

15. The method of claim 13, the method further comprising:
determining, by the power system, a second status of the first power supply, the second status of the first power supply corresponding to a transition of the first power supply from the disruption of the first power supply able to supply the regulated power to the power consumer to a resumption of the first power supply able to supply the regulated power to the power consumer; and,
in response to the power system determining the second status of the first power supply, and based on the first set of batteries coupled to the second power supply, the power system coupling the first set of batteries to the first power supply.

16. The method of claim 13, the method further comprising:
determining, by the power system, a first status of the second power supply, the first status of the second power supply corresponding to a disruption of the second power supply able to supply the regulated power to the power consumer; and,
in response to the power system determining the first status of the second power supply, the power system coupling the second set of batteries to the first power supply, in combination with the first set of batteries coupled to the first power supply, to combine the second power capacity of the second set of batteries with the first power capacity of the first set of batteries to particularly configure fourth battery power, having a second combined power capacity not less than the standup capacity, coupled to the first power supply.

17. The method of claim 16, the method further comprising:
detecting, by the power system, a disruption of a primary power source supplying primary power to the first power supply, the primary power source exclusive of the first and the second set of batteries; and,
in response to the power system detecting the disruption of the primary power source supplying the primary power to the first power supply, and based on the second set of batteries coupled to the first power supply, the power system configuring the first power supply to receive the fourth battery power to supply the regulated power to the power consumer.

18. The method of claim 16, the method further comprising:
determining, by the power system, a second status of the second power supply, the second status of the second power supply corresponding to a transition of the second power supply from the disruption of the second power supply able to supply the regulated power to the power consumer to a resumption of the second power supply able to supply the regulated power to the power consumer; and,
in response to the power system determining the second status of the first power supply and, based on the second set of batteries coupled to the first power supply, the power system coupling the second set of batteries to the second power supply.

19. The method of claim 13, wherein the first status of the first power supply is selected from a group consisting of: a fault of the first power supply; a status corresponding to a service state of the first power supply; a fault in the coupling of a battery, among the first set of batteries, and the first power supply; and, a disruption of the first power supply receiving power, from a primary power source exclusive of the first and second set of batteries, to supply the regulated power to the power consumer.

20. The method of claim 13, wherein the hold-up time further corresponds to a period of time selected from a group consisting of: a period of time for the power consumer to power down; a period of time for the power consumer to enter a state not requiring the first and the second power supply to supply the regulated power; and, a period of time to resume at least one of the first and the second power supplies receiving primary power, from a primary power source exclusive of the first and the second set of batteries, in association with a disruption of the first and the second power supplies receiving the primary power.

* * * * *